(12) United States Patent
Talluri et al.

(10) Patent No.: US 9,923,375 B2
(45) Date of Patent: Mar. 20, 2018

(54) METHOD AND A SYSTEM FOR A FAST BUS TRANSFER IN AN ELECTRICAL POWER SYSTEM

(71) Applicant: ABB TECHNOLOGY LTD, Zurich (CH)

(72) Inventors: Anil Talluri, Bangalore (IN); Gajanan Lade, Latur (IN); Rahul Radhakrishnan, Kerala (IN); Sethuraman Ganesan, Bangalore (IN)

(73) Assignee: ABB Schweiz AG, Baden (CH)

( * ) Notice: Subject to any disclaimer, the term of this patent is extended or adjusted under 35 U.S.C. 154(b) by 340 days.

(21) Appl. No.: 14/676,517

(22) Filed: Apr. 1, 2015

(65) Prior Publication Data
US 2015/0270714 A1 Sep. 24, 2015

Related U.S. Application Data

(63) Continuation of application No. PCT/IB2013/059037, filed on Oct. 1, 2013.

(30) Foreign Application Priority Data

Oct. 1, 2012 (IN) .......................... 4090/CHE/2012

(51) Int. Cl.
*H02J 3/42* (2006.01)

(52) U.S. Cl.
CPC ............. *H02J 3/42* (2013.01); *Y10T 307/696* (2015.04)

(58) Field of Classification Search
CPC .... H02J 5/005; H02J 7/025; H02J 3/00; H02J 50/12; H02J 3/01; H02J 7/06; H02J 3/14; H02J 3/16; H02J 3/18; H02J 3/42
(Continued)

(56) References Cited

U.S. PATENT DOCUMENTS

| 5,311,066 A | 5/1994 | Malloy et al. |
| 5,619,119 A | 4/1997 | Pelletier et al. |

(Continued)

FOREIGN PATENT DOCUMENTS

| EP | 0 567 801 A2 | 11/1993 |
| WO | WO 94/27351 A1 | 11/1994 |

OTHER PUBLICATIONS

International Search Report (PCT/ISA/210) dated Apr. 24, 2014, by the European Patent Office as the International Searching Authority for International Application No. PCT/IB2013/059037.

(Continued)

*Primary Examiner* — John Poos
(74) *Attorney, Agent, or Firm* — Barnes & Thornburg LLP

(57) ABSTRACT

A method for synchronizing and connecting a first sub power system with a second sub power system with an intelligent electronic device (IED) by use of at least one switching device between the first sub power system and the second sub power system in an electrical power system is provided. The IED monitors power supply parameters such as voltage magnitude, phase and other derived parameters such as voltage and phase differences in the first sub power system and the second sub power system to identify at least one instance for fast bus transfer where the two sub systems have acceptable differences in magnitude and phase. The IED performs phase shifting and voltage magnitude correction in anticipation for synchronizing power supplies on connection at the identified instance.

12 Claims, 12 Drawing Sheets

(58) Field of Classification Search
USPC .................................................. 307/80, 105
See application file for complete search history.

(56) References Cited

U.S. PATENT DOCUMENTS

| | | | |
|---|---|---|---|
| 6,239,997 B1 | 5/2001 | Deng | |
| 6,327,162 B1 * | 12/2001 | Larsen | H02J 3/1814 307/103 |
| 2004/0172204 A1 | 9/2004 | Eaton et al. | |

OTHER PUBLICATIONS

Written Opinion (PCT/ISA/237) dated Apr. 24, 2014, by the European Patent Office as the International Searching Authority for International Application No. PCT/IB2013/059037.

* cited by examiner

METHOD AND A SYSTEM FOR A FAST BUS TRANSFER IN AN ELECTRICAL POWER SYSTEM

RELATED APPLICATION

This application claims priority as a continuation application under 35 U.S.C. § 120 to PCT/IB2013/059037, which was filed as an International Application on Oct. 1, 2013 designating the U.S., and which claims priority to Indian Application 4090/CHE/2012 filed in India on Oct. 1, 2012. The entire contents of these applications are hereby incorporated by reference in their entireties.

FIELD

The present disclosure relates generally to the field of power management systems, and more specifically to methods of synchronizing power supplies for fast bus transfer in a power system.

BACKGROUND INFORMATION

In industrial power systems, a High-speed Bus Transfer System (HSTS) scheme is applied to transfer critical loads from one source to another source during disturbances. Under normal running conditions, the loads, predominantly induction motors, are continuously connected to a source which may be called as the Main source. On failure of the Main source, the loads are transferred to a Standby source. Attempts have been made to re-connect the load to the Standby power as quickly as possible. This is to ensure that the voltage, frequency and phase angle differences across the breaker poles are within synchronizing limits, to reduce shock to the induction motors and other connected loads. This is called 'Fast' transfer. Though this is a desirable type of transfer, it may be a challenge to achieve this. This is because, the angle of the phase voltages induced in the motor might have already gone out of synchronization (synch) with the standby source, or a reasonable time (say 50-100 mSec) may not be available to check synchronization and breaker closing such as when droop in frequency and hence the phase angle rate of change at the load bus is too fast to allow such a time.

If a 'Fast' transfer opportunity is missed, motors start to slow down. The induced voltage phase angle would drift further away from the standby incoming source voltage. An attempt may be made to re-synchronize when the drift completes 360 degrees, when the two voltages are nearly in phase again. This period when the drift completes 360 degree, is referred to as one slip cycle, and is greater than the source AC power cycle. Re-synchronization is possible only when the load bus voltage magnitude and frequency are above critical levels. This method is designated as transfer at "First phase co-incidence" or "In phase" transfer and is known.

If the above condition is also not met, the motors spin down further until the voltage collapses to a very low voltage, say 20%, before attempting to reconnect to a standby source. The challenge in such a scenario is related to dealing with heavy starting current surge, mechanical shocks to connected loads, etc.

Thus, it would be desirable to have a method and system that provide efficient and fast transfer of load.

SUMMARY

A method is disclosed for synchronizing and connecting a first sub power system with a second sub power system with an intelligent electronic device (IED) by use of at least one switching device between the first sub power system and the second sub power system in an electrical power system, wherein the second subsystem includes a voltage decaying in magnitude and frequency at a first rate of change, the method be implemented on the IED and comprising: a) monitoring power supply parameters for the first sub power system and the second sub power system; b) identifying at least one instance for operating the at least one switching device using the monitored power supply parameters, and selecting one instance to connect the first sub power system and the second sub power system, wherein identifying at least one instance includes predicting magnitudes of phase angle difference and voltage difference between the first sub power system and the second sub power system, based on measured signal values of the power supply parameters and the first rate of change; c) performing phase shifting and/or voltage magnitude correction in the electrical power system in anticipation for synchronizing power supplies on connection of the first sub power system with the second sub power system at the selected one instance; and d) operating the switching device to connect the first sub power system and the second sub power system in the electrical power system at the selected one instance; e) wherein performing of the phase shifting and voltage magnitude correction in anticipation for synchronizing power supplies on connection of the first sub power system with the second sub power system at the selected one instance includes cross switching of one or more phases in the electrical power system.

A synchronizing system is also disclosed for an electrical power system to synchronize and connect a first sub power system with a second sub power system, comprising: a) an Intelligent Electronic Device (IED) that monitors power supply parameters for a first sub power system and a second sub power system to identify at least one instance of time for synchronization, and to select an instance of time for connection, the IED being configured to issue commands for synchronizing and connecting the first sub power system with the second power system; b) at least one switching device to operate and connect a first sub power system and a second sub power system on receiving a command from the IED; and c) a means for phase shifting and/or voltage magnitude correction in a first sub power system or a second sub power system to enable synchronization between the first sub power system and the second sub power system at a selected instance of time on receiving a synchronization command from the IED; d) wherein, the selected instance for operating the at least one switching device is within an AC slip cycle time period.

BRIEF DESCRIPTION OF THE DRAWINGS

Other features and advantages will become apparent to those skilled in the art upon reading the description of exemplary embodiments in conjunction with the accompanying drawings, wherein.

DETAILED DESCRIPTION

Figure 1:
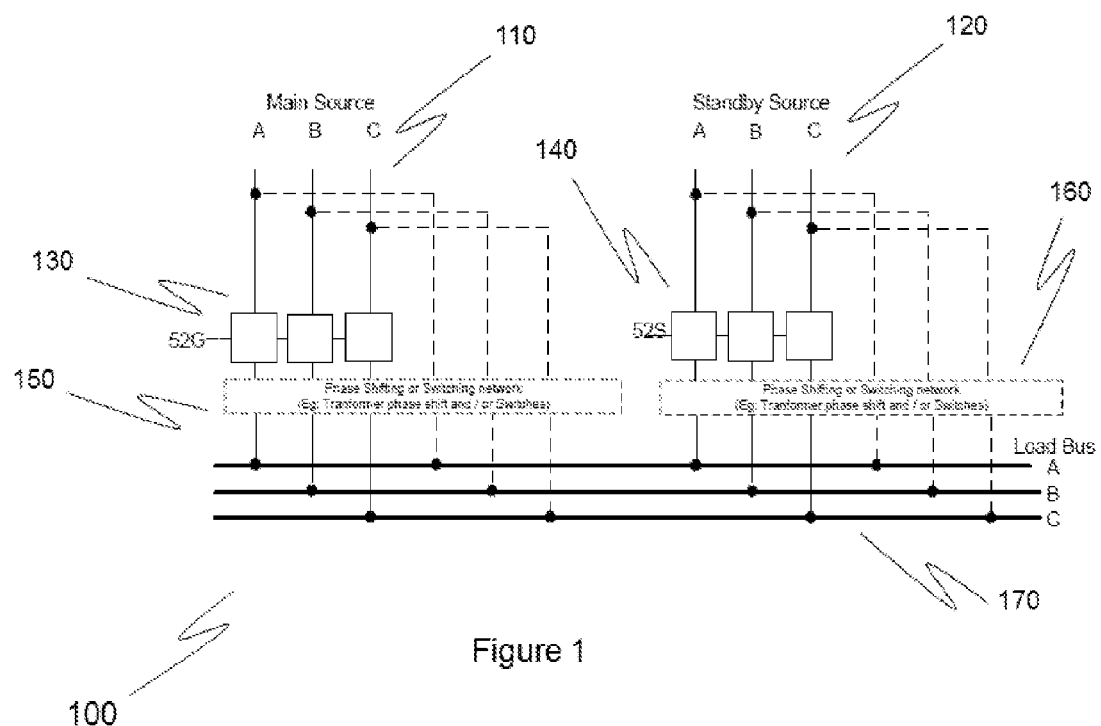
FIG. 1 illustrates overall principles disclosed herein.

Methods are disclosed to improve the probability of successful reconnection of two electrical sub power systems. Applications are mainly in extending power supplies to critical loads in industrial systems, but the methods can also be used, for example, for EHV systems to resynchronize two major power systems faster, before stability is irretrievably lost waiting for synchronizing to happen. The methods can be applied when there are no local means to control the speed/frequency and voltage of both of the systems to be connected. In such systems, it is usual to wait for a synchronization condition to occur and an attempt is made to reconnect the systems. Exemplary embodiments can proactively modify one or both of the system phases/voltages by use of additional components for phase shifting or/and voltage corrections to derive a set of voltages which can be brought in phase with each other's voltages much earlier, improving the chances to reconnect the two systems under the control of an intelligent electronics device (IED) in the electrical power system.

In an exemplary aspect, a method for using an Intelligent Electronic Device (IED) to synchronize power and connect a first sub power system with a second sub power system by use of at least one switching device between the first sub power system and the second sub power system in an electrical power system is provided. The method can include:

a) monitoring power supply parameters for the first sub power system and the second sub power system;
b) identifying at least one instance for operating the at least one switching device using the monitored power supply parameters and selecting one instance to connect the first sub power system and the second sub power system;
c) performing phase shifting and/or voltage magnitude correction in anticipation of synchronizing power supplies on connection of the first sub power system with the second sub power system at the selected one instance; and
d) operating the switching device to connect the first sub power system and the second sub power system in the electrical power system at the selected one instance.

In an exemplary embodiment, the method is illustrated for a power system where the first sub power system is an incomer system and the second sub power system is a load system.

In another embodiment, the method is illustrated for a power system where the first sub power system or the second sub power system is a power generating system.

In another embodiment, the monitored power supply parameters include measured electrical voltage, current and frequency parameters, and derived information from computing performed in the IED using the measured electrical voltage, current and frequency parameters including at least one of rate of change of electrical parameters, time to operate the switching device, and time to perform phase shifting, differences in magnitude and phase angles and other such parameters that can be computed or measured in the power system.

In another embodiment, the instance for operating the switching device(s) to connect the first sub power system and the second sub power system is identified by analyzing available instances for synchronization resulting from having phase shifting or voltage magnitude correction carried out in the first sub power system or the second sub power system.

In yet another embodiment, the method illustrates phase shifting or/and voltage correction in anticipation of synchronizing power supplies on connection of the first sub power system with the second sub power system at the selected one instance by the IED for making a synchronized connection that includes cross switching (cross arrangement) of one or more phases in the electrical power system or making phase/voltage magnitude corrections using a phase shifting transformer in the electrical power system.

In yet another embodiment, the method illustrates identifying the instance for operating the switching device(s) by the IED within an AC slip cycle time period from the instance identifying a need for connecting the first sub power system with the second sub power system (e.g., through external command or input). Thus, the method can provide for a fast bus transfer providing number of opportunities to make synchronized connection in the power system.

In yet another embodiment, the method illustrates identifying the instance for operating the switching device(s) at an instance at which voltage in the load system is more than about 70% of the voltage in the incomer system (e.g., the difference in voltage between the two electrical sub system is less than 30%). The difference, if large, on a possible opportunity of connection as a result of synchronization in phase, a suitable correction to the voltage level through use of transformers, tap changers or load shedding can be used to provide voltage correction for fast and efficient bus transfer.

In another exemplary aspect, a synchronizing system in an electrical power system to synchronize and connect a first sub power system with a second sub power system is provided. The system can include:

a) an Intelligent Electronic Device (IED) that monitors power supply parameters for the first sub power system and the second sub power system and identifies at least one instance for connecting the two sub systems. The IED also selects a suitable one instance for transfer and issues commands for synchronizing, and connecting the first sub power system with the second power system at the selected instance of time;

b) at least one switching device to connect the first sub power system and the second sub power system on receiving the command from the IED. The switching device can be a circuit breaker or disconnector switch with appropriate interlocks; and c) a means for phase shifting and/or voltage magnitude correction in the first sub power system or the second sub power system to enable synchronization between the first sub power system and the second sub power system at the selected one instance of time on receiving synchronization command from the IED.

In an exemplary embodiment, the system is illustrated to identify one or more instances for operating the switching device(s) within a full slip cycle time period that is within the time from the starting of power cycle from 0 degree coincidence to 360 degree coincidence. For fast transfer, the time of transfer can be well within the full slip cycle time period from the instance the IED identifies a need for connecting the first sub power system with the second sub power system.

In another embodiment, the synchronizing system in an electrical power system is illustrated with switching device(s) that is a circuit breaker(s) or a disconnector switch(es). The means for phase shifting and/or voltage correction in the first sub power system or the second sub power system to enable fast and efficient synchronization between the first sub power system and the second sub power system at the identified instance of time can be carried out by operating the switching device or a phase shifting transformer such that at the time of connection, efficient bus transfer is achieved.

The present disclosure relates, in part, to a 'Transfer at first phase coincidence' technique. An exemplary proposed method can be used to manipulate the Standby source voltage phases, either by way of switching or phase shifting or a combination of such action as required to reconnect a source to the load bus as quickly as possible. The manipulation can be done in either or both of the systems (source and load), but exemplary embodiments further consider manipulation only of one side (Source) of the power system for clarity of description. An overview is provided with the help of FIG. 1 that illustrates a part of power system 100 having a main source 110 and a standby source 120. Breakers 52G indicated with numeral 130 and 52S indicated with numeral 140 are provided to connect the main source 110 or the standby source 120 to a load bus 170 as the need maybe for the source connection. Phase shifting components 150 and 160 can be used to achieve fast bus transfer.

One of the methods to manipulate the incoming supply phase angle can be a rearrangement (cross-switching) of the three phases. This gives the possibility of three choices of incoming voltage phases which are 120 degree apart for a possibility to synchronize the load bus with incoming source. Other multiples of 30 degree angles are possible using Delta/Wye windings in the incoming supply. Other angles are also possible using a combination of windings. Should the system be single phase, it is possible to look at 180 phase rearrangement at very least. Exemplary embodiments allow for manipulation of voltage magnitude and can achieve high speed re-connection though phase switching as an economical way to achieve a quicker first phase co-incidence transfer, described herein in detail for a three phase system.

The three phases A, B and C of an exemplary power system may be considered as three individual voltage sources, coupled together such that the phase angles are separated by 120 degrees. When synchronizing two three phase systems (also referred as first sub power system and second sub power system), phases A, B and C of one system are, for example, synchronized with phases A, B and C of another in the same order. With an exemplary method as disclosed herein, a flexibility in the switchgear connection arrangements such that, phases A, B and C of a system can be synchronized with phases B, C and A (also/alternatively phases C, A and B), in addition to conventional phases ABC of the second system. With this method, while transferring or re-synchronizing of power systems, on missing a synch opportunity for 'Fast Transfer', one need not wait for a full 360 degree slip cycle, rather make additional attempts at 120 or 240 degrees of slip, by changing the phases of connection. This will result in shorter waiting time, enabling closing of the breaker with less frequency and voltage differences across the breaker poles, thereby reducing the shock to the connected loads and the system. The probability of successful reconnection is very high with lower differences in frequency and voltage magnitudes, especially when reconnecting two independent power systems which are swinging away from each other on a power disturbance. In industrial power systems, should re-transfer with the main source be needed, similar switching needs to be done in parallel to avoid out of synch closing with that source. This arrangement is achieved through the phase switching components (phase shifting devices) 150 and 160 under the control of a programmed intelligent electronics device (IED) used for control and protection in a power system.

Figure 2:
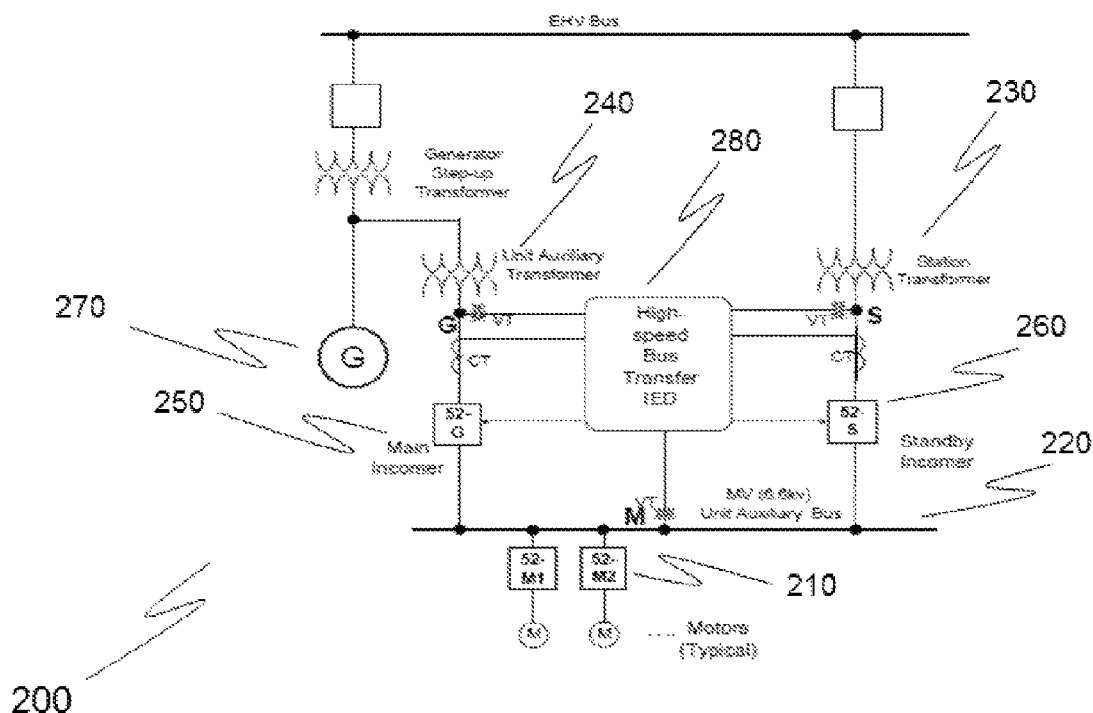
FIG. 2 is a one line diagram of a known supply scheme to a Unit Auxiliary Bus, feeding a number of motor loads of a major Thermal Power Unit.

FIG. 2 illustrates an exemplary supply arrangement 200 to auxiliary loads of a major thermal generating unit. The auxiliary loads can be predominantly composed of major induction motors 210 driving Boiler feed pumps, Induced Draft fans, Forced Draft fans etc., and are connected to the Unit Auxiliary Bus 220. While starting up the generating unit, 270, the Unit Auxiliary Bus gets energy from a station transformer 230. Once the unit is brought up to full speed and the generator gets synchronized, the Unit Auxiliary Bus gets transferred to an Unit Auxiliary Transformer 240. This is accomplished by closing breaker 52G, 250 momentarily paralleling the two sources and then tripping the breaker 52S, 260. The operations of the breakers 250 and 260 are managed by an IED 280. During steady generating conditions, breaker 52G remains closed and breaker 52S remains open. During a fault condition in the generating unit, the breaker 52G trips cutting off supply to the Unit Auxiliary Bus 220. It is however essential to keep running the auxiliary motors connected to the auxiliary bus.

The High Speed Bus Transfer scheme gets primed at the same time when a trip command is issued to the breaker 52G, 250 and thus the IED identifies a need for bus transfer. Based on various criteria considered by the IED 280, the closing command will be issued to 52S, 260. Assuming a simultaneous command going out to breakers 52G and 52S, should the trip time of 52G be longer than closing time of 52S, there could be a momentary paralleling of the breaker before transfer occurs. This may not be always allowed depending on the fault type in the generator system. In most cases, the trip time of 52G, 250 is expected to be less. This invariably results in a momentary loss of power on the unit bus from both sources. However the connected major induction motors back emf would keep the bus voltage alive during this duration, characteristically dropping down in frequency and voltage, depending on various factors including connected loads, stored magnetic energy in the stator and rotor of the induction motors etc.

When an attempt is made to reconnect the load bus to the standby source, a synch-check has to be done by the IED, 280 to ensure that the deteriorating voltage magnitude and frequency of the load bus are not too low compared to the standby system parameters, as well as that the phase angle drift is not too far from the standby system. Under these circumstances, a reconnection to the standby source within a few power cycles, if allowed by the synch-check, would be the most preferable and is generally designated as 'Fast Transfer'.

Figure 3:
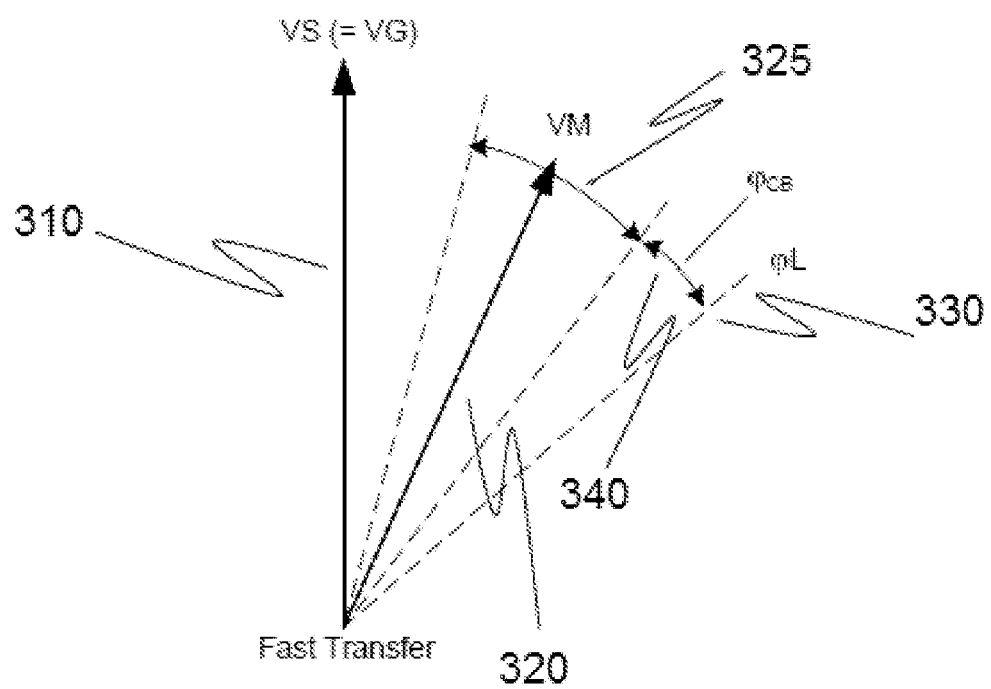
FIG. 3 shows exemplary limits of voltage and phase angle differences when closing to a load bus.
Figure 4:
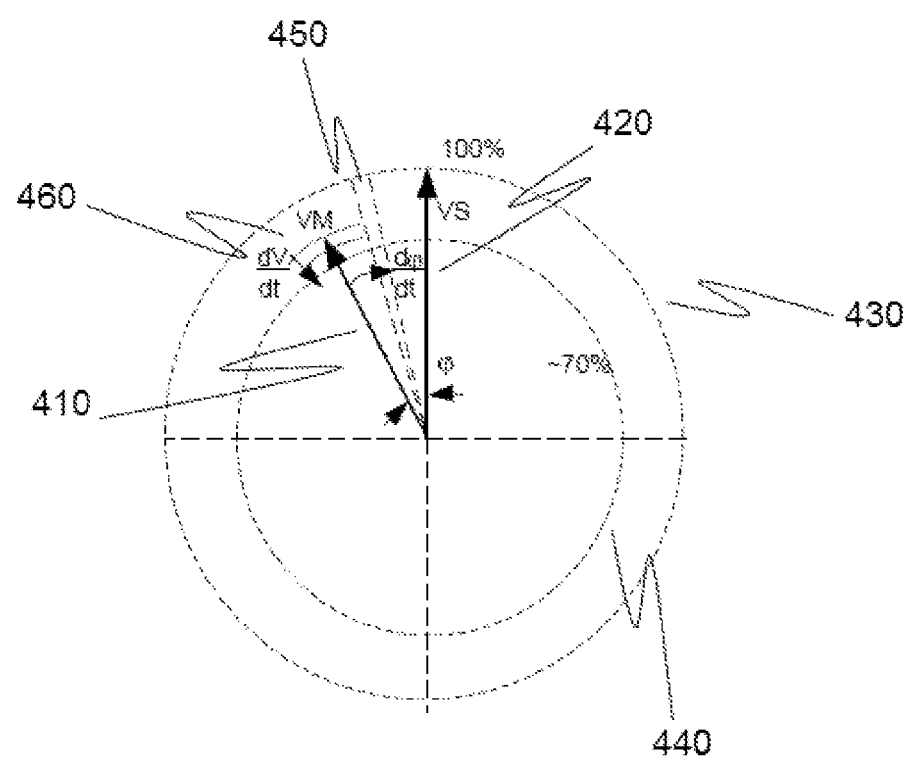
FIG. 4 illustrates limits of phase angles for close commands from an IED.

In FIGS. 3 and 4, the challenges associated with bus transfer are illustrated by use of power supply parameters. FIG. 3 depicts phasor relationships for power supply parameter signals in the exemplary electrical system 200 illustrated in FIG. 2. The figure shows VS (stand by source voltage), 310 as a steady phasor and is for example, in step with the main source voltage VG (also shown as 310). The phasor VM depicted by numeral 320 represents the status of load bus voltage, after it has been disconnected from the main source VG but yet to be connected to standby source VS. During this transition, typical of a motor bus voltage running down in the absence of any source, the phasor VM would decay both in magnitude as well as frequency as illustrated in the phasor. The latter results in a continuous shift in VM's phase angle with respect to VS. Thus, the phasor VM, which was coincident with and equal to VG, has started separating and is falling behind VS. The standby source can be connected to the load bus only when: 1) VM does not fall behind VS by a critical angle φL depicted by numeral 330; 2) The voltage difference magnitude is less than 30% (appx.), illustrated by the numeral 325; and 3) The frequency difference is within limits at the time of closure. The time required for the breaker to close has to be accounted for accordingly in any close command to the breaker to ensure closure of breaker at the desired time (illustrated by numeral 340). In other words, at the time of issuing the close command, a prediction has to be done as to the magnitude of phase angle difference and voltage difference, based on the measured signal values as well as their rates of changes (V, dV/dt, f, φ and dφ/dt). The rates of change of signals dV/dt and dφ/dt depend on a number of factors including the number of motors connected to the bus, how much they are loaded and the type of loads etc. These factors are considered to select a suitable instance for bus transfer.

On missing out a 'Fast' transfer option, the load bus is allowed to spin down to go through almost a full circle of 360 degrees phase angle difference (one slip cycle). Just prior to the first phase co-incidence, checks are made if the voltage, frequency magnitudes and their rates of fall would allow a successful reconnection.

FIG. 4 represents phasor positions in a system with a view to do transfer at "first phase co-incidence". The close command shall be given such that, allowing for the time of breaker to close, the VM phasor 410 would be 1) 'In phase' with VS 420; 2) The voltage difference magnitude is less than 30% (appx.) as VM phasor is depicted to be between the region encompassed by numerals 430 and 440; and 3) the rate of frequency fall 450 and voltage fall 460 are within acceptable limits.

So far in the above discussions, the voltage phasors in FIGS. 3 and 4 were assumed to be the same phases of the standby source and load bus, typically say phase A in both the systems. In order to explain features disclosed herein, beyond this point, the phase references are added as suffices in the phasor diagrams.

Figure 5A:
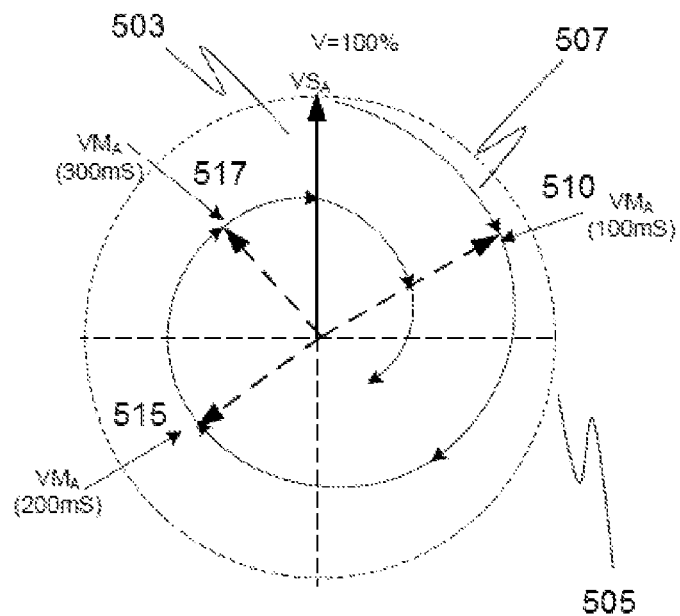
FIG. 5a illustrates variations in voltage magnitude and phase angle of a motor load bus in comparison with a standby source voltage, referring to a particular Phase-A of a three phase system.

FIG. 5a illustrates an exemplary phasor A of standby source ($VS_A$), 503 having a region 505, and loci of phasor A, 507, of load bus ($VM_A$) with respect to time, from the moment the load bus gets separated from the main source. Time scale is indicated along the path of the loci at 510, 515 and 517 to corresponding to 100 mS, 200 mS, and 300 mS respectively. It may be noted that as the time progresses the magnitude of $VM_A$ decreases and its phase angle with respect to $VS_A$ increases from the loci of phasor A, 507.

Figure 5B:
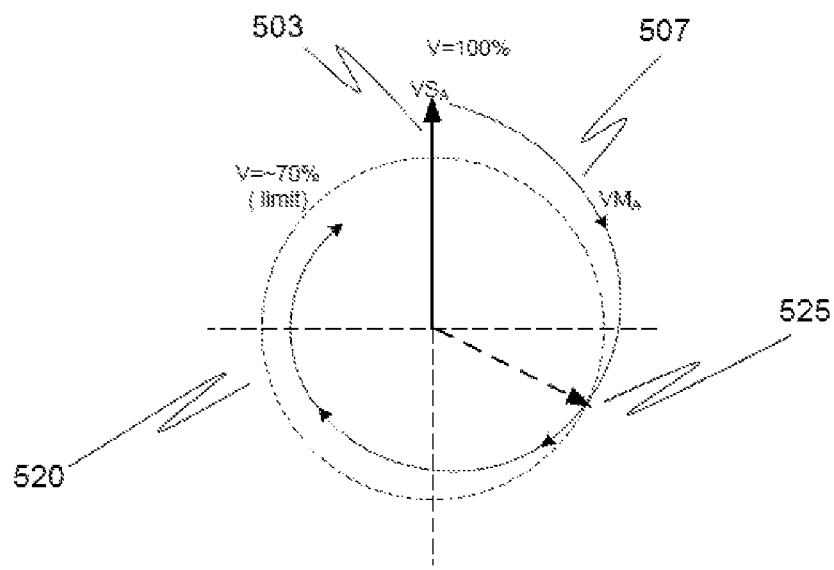
FIG. 5b illustrates a limit of motor load bus voltage at 70% of a nominal voltage magnitude when the angle and magnitude of the motor load bus keeps varying with respect to a standby source voltage.

FIG. 5b is a reproduction of an initial portion of loci of $VM_A$ 507 in FIG. 5a, but with the limit of voltage approximately 70% superposed as a circle 520. It may be observed that as the magnitude of $VM_A$ decreases, the magnitude falls below 70% even when the phase angle difference is increasing beyond about 90 degrees. It may be observed that beyond this point of time (525), voltage would only keep decreasing and there is no way the two systems can be synchronized.

Figure 5C:
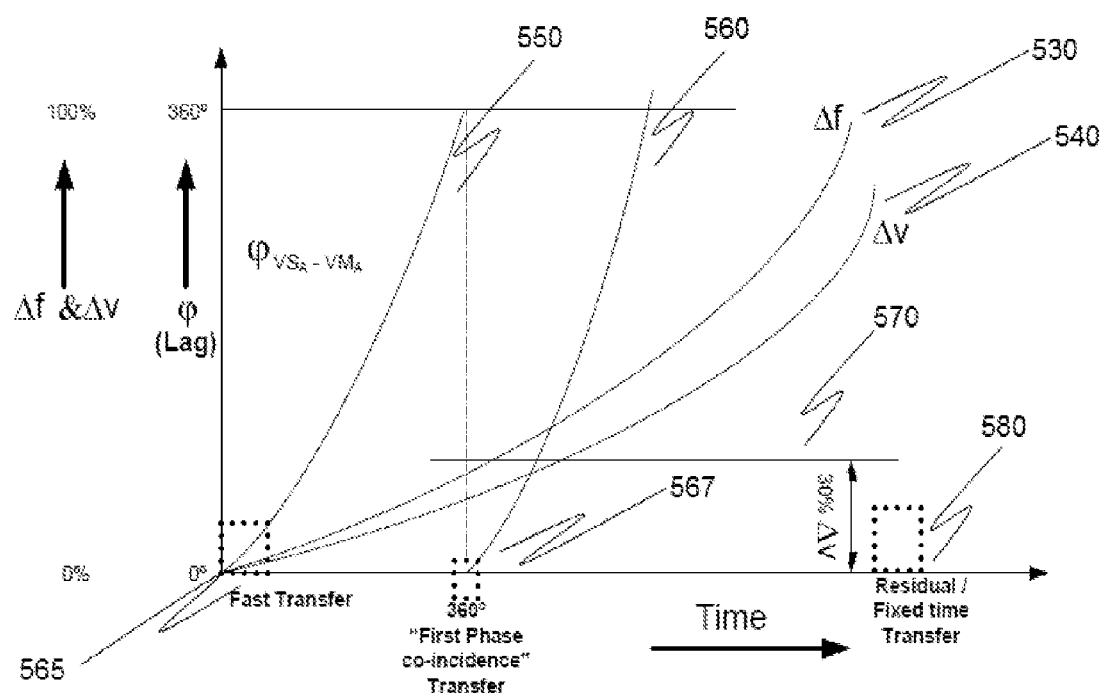
FIG. 5c illustrates variations in voltage magnitude, frequency and phase angle of a load bus with respect to a standby system voltage.

FIG. 5c shows the absolute values of difference in frequency (Δf) 530, difference in voltage (ΔV) 540 and the phase angle difference ($φ_{VSA-VMA}$) 550, 560, between the two voltage phasors as a function of time. Note that "Fast Transfer" possibility occurs immediately after loss of power source (565) and "First Phase co-incidence Transfer" when the angle between the two phasors is about 360 degrees (567). The desired criteria to have the bus transfer carried out within 30% difference in voltage is represented for reference with numeral 570 in the figure. Another opportunity at residual or fixed time, when the load voltage has reduced to residual value or near zero value occurs much later and is depicted with numeral 580 in the figure.

Figure 6A:
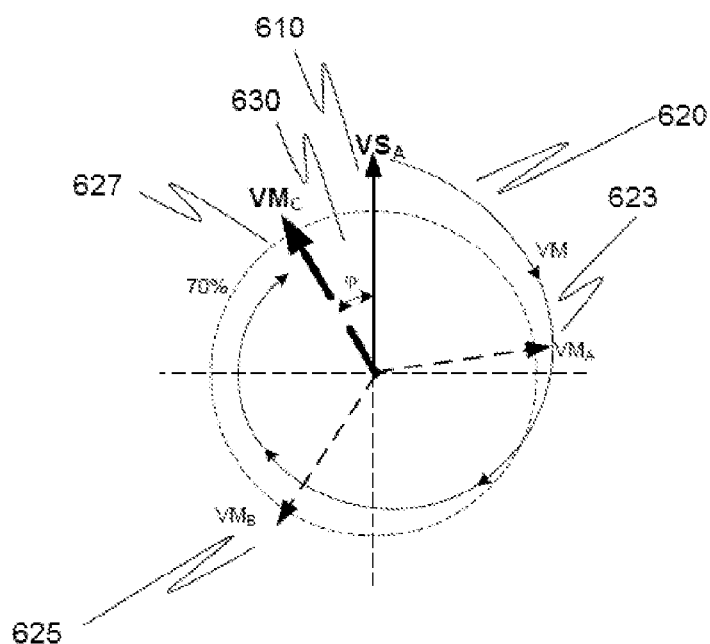
FIG. 6a illustrates the phase A voltage of a standby source along with all three phase voltages of the motor bus.

FIG. 6a illustrates phasors corresponding to phase A for standby source $VS_A$ (610) and the load bus $VM_A$ (620) as well as the phasors for B and C phases of load bus $VM_B$ and $VM_C$ (625, 627), captured at an instance of time. At this instance phase A of the load bus ($VM_A$) is having significant phase difference with respect to phase A of the standby source. However, note that C phasor of load bus $VM_C$ is ahead of $VS_A$ and is closing in on it with a small difference in phase (630). If only a reconnection can be made from phase C of the load bus to phase A of the incoming source (as well as suitably for other two phases as well), a fast transfer is established. As previously discussed, sufficient time needs to be available for breaker to close before these two phasors are co-incident taking into account rate of deterioration of both phase angle and voltages, and accordingly a close command can be given to synchronize the load with the source bus successfully.

Figure 6B:
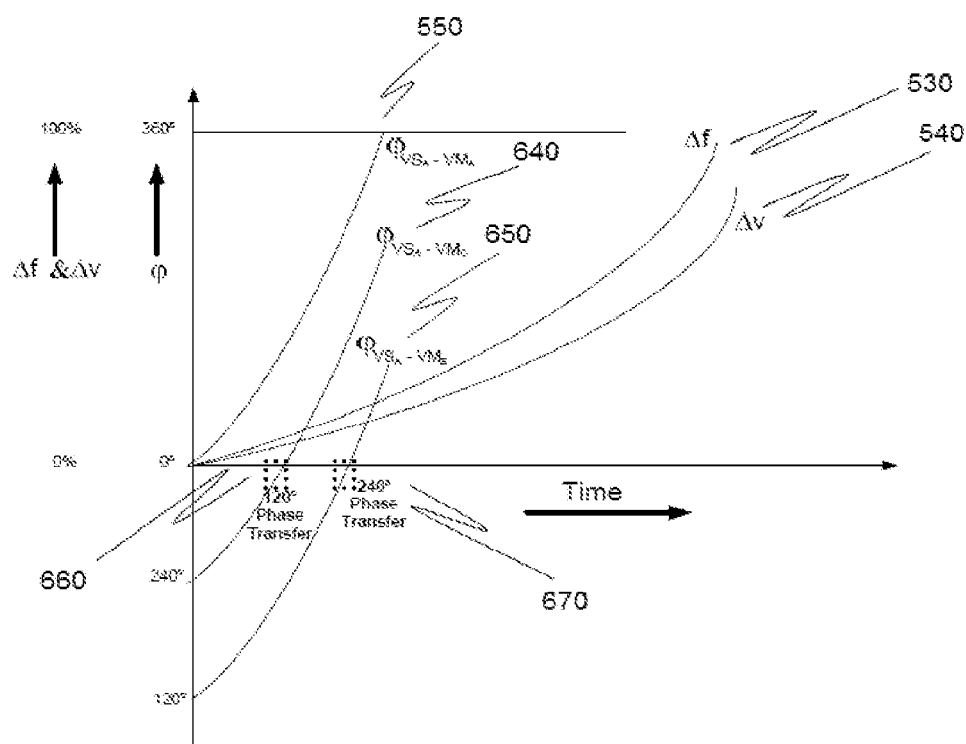
FIG. 6b illustrates variations of differences in voltage magnitude, frequency and the phase angle of a load bus of three phases with respect to the standby system voltage phase A.

Referring to FIG. 6b and comparing with FIG. 5c, note the additional plots of phase angle difference between phasors $VS_A$ Vs $VM_C$ ($φ_{VSA-VMC}$), 640 as well as phase angle difference between phasors $VS_A$ Vs $VM_B$ ($φ_{VSA-VMB}$), 650 are depicted. Note that along the time scale, two additional opportunities (660, 670) to synchronize the load bus are also available, much earlier than the known method of synchronizing at 360 degrees (567). The probability that such synchronization can happen much before the differences in voltages and frequencies increase beyond comfortable levels will appreciated by those skilled in the art, as these instances are much before the 360 degrees synchronization opportunity.

Figure 7:
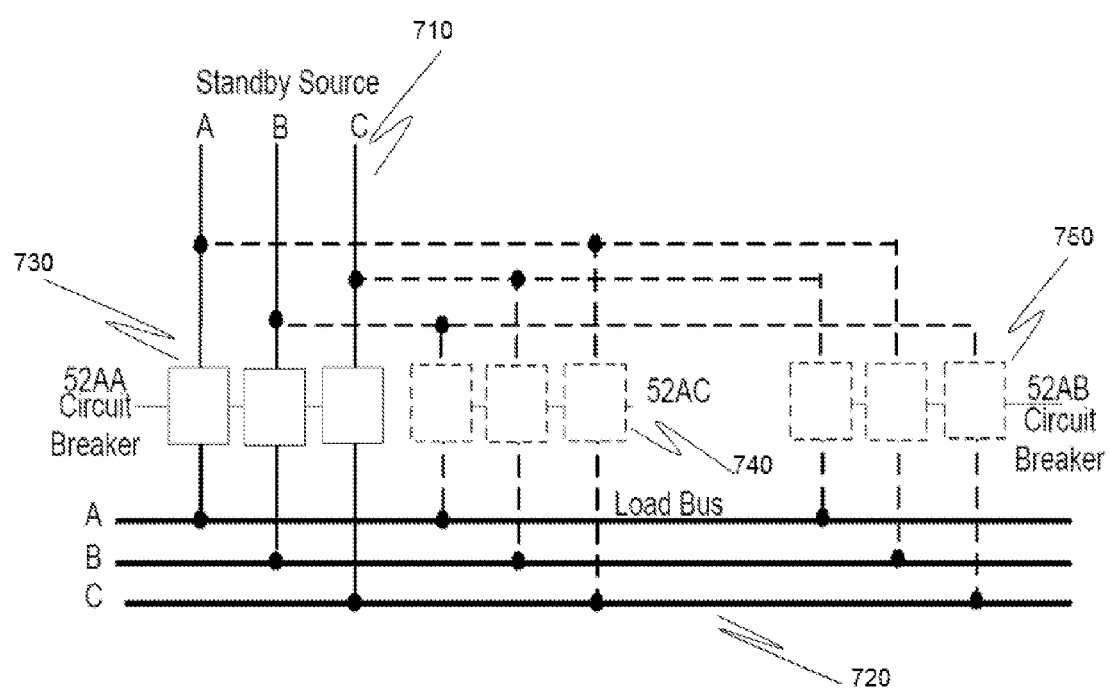
FIG. 7 illustrates an exemplary three breakers arrangement to connect the bus phases ABC of a standby source with the motor load bus, with an ABC connection along with CAB or BCA in that sequence as alternatives.

FIG. 7 illustrates an exemplary schematic for connecting the standby source (710) to the load bus (720). The schematic shows a set of circuit breakers 730 to connect the standby source in the same phase sequence with the load. The set of breakers (52AC) represented with numeral 740 are breakers to allow phase A of the standby source to be routed to phase C of the load bus to achieve synchronization for bus transfer within a 360 degree wait period. Also the set of breakers (52AB) depicted with numeral 750 are provided to allow phase A of the standby source to be routed to phase B of the load bus for fast bus transfer.

Figure 8:
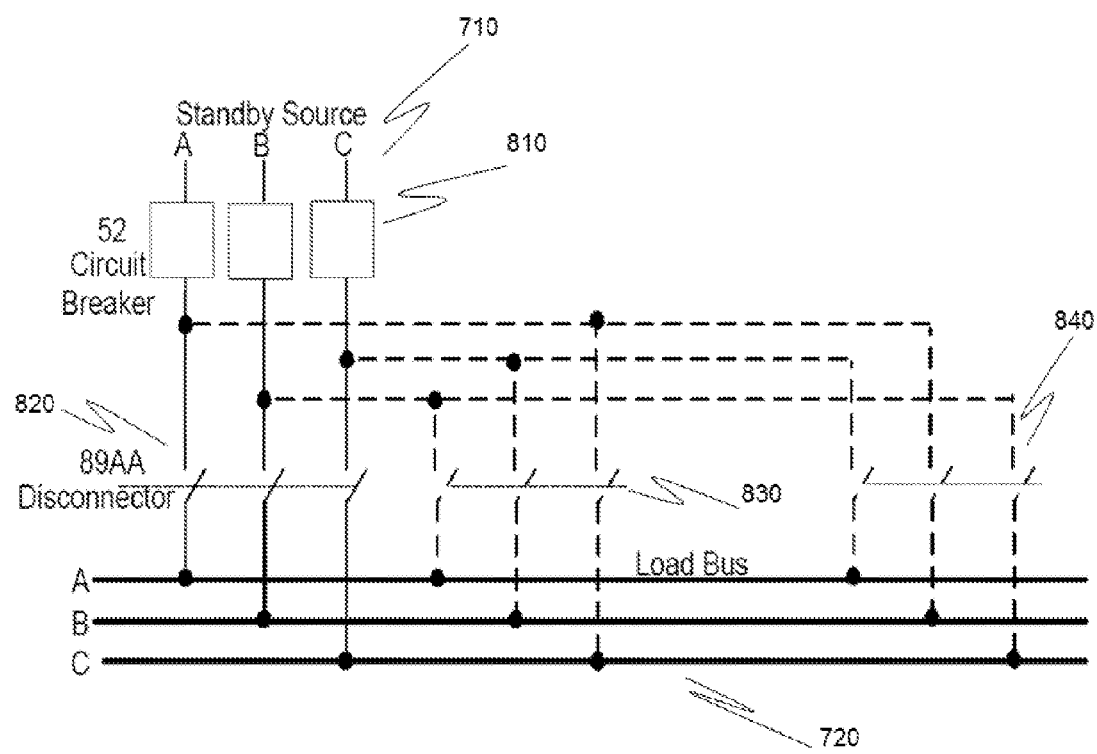
FIG. 8 illustrates an exemplary single breaker and a three disconnectors arrangement to achieve synchronized fast bus transfer.

FIG. 8 illustrates an exemplary embodiment where instead of using additional breakers as shown in FIG. 7, a common breaker 810 with disconnector arrangements (820, 830, 840) is shown. This arrangement can be more economical. The disconnectors have to have quick operating times.

In cases requiring transfer of the load back to the main source, it is necessary to have a similar phase switching arrangement at the main connection point. In such an arrangement the load bus is permanently at a 120 degree lead with respect to the source voltages.

Figure 9:
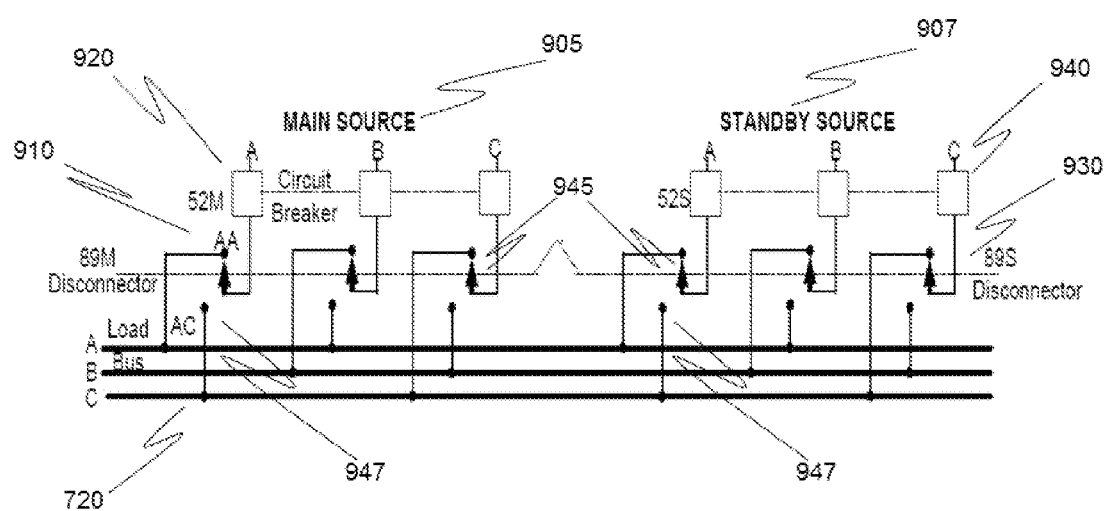
FIG. 9 illustrates an exemplary two position high speed disconnector/switch arrangement to connect incoming phases ABC with the motor load bus in ABC, CAB phases in that order, with flexibility of changeover as well as reconnection back to the system with inherent interlocks at a disconnector level to avoid asynchronous closing.

A simplified exemplary schematic of the overall switching scheme with a two position high speed isolator is shown in FIG. 9. Note that the two position disconnector 89M (910) is used with the main source (905) path in series with the main source breaker 52M (920). Disconnetor 89S (930) is a similar one used in series with the breaker 52S (940) in the standby source (907) path. Both disconnectors can be ganged or interlocked so that they both can be in position AA (945) or AC (947). In position AA, phases ABC of the sources are connected to phases ABC of the load bus. In position AC, phases ABC of the sources are connected to phases CAB of the load bus. Under healthy conditions, breaker 52M (920) is closed, 52S (940) is open and 89M/89S (910, 930) are in position AA (945). On loss of main source, an attempt is made to close the breaker 52S (940). On failure of this process, the disconnector position is changed immediately to AC (947). An attempt can now be made to close the 52S breaker (940) to reconnect the load bus with the system at 120 degree coincidence as described earlier. Once the Main source is restored, the breakers 52M could be closed prior to opening 52S with momentary paralleling. However the load bus voltage is 120 degree behind the Main source voltage during running conditions.

Assuming a transfer has taken place and the disconnector is in position AC (947), should another bus transfer become necessary with a similar 120 degree phase switching, a further switching arrangement to switch A phase of the source to phase B of load bus is required.

Figure 10:
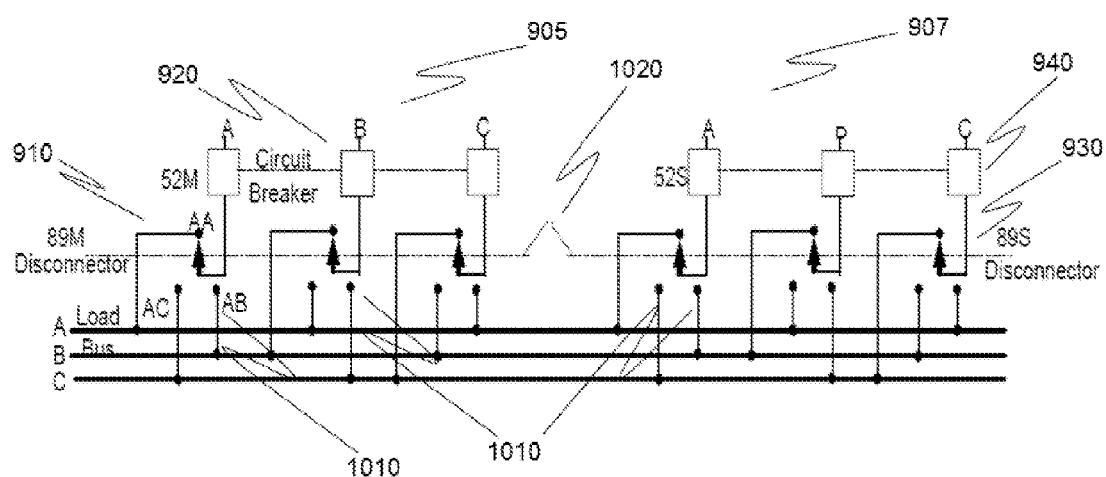
FIG. 10 illustrates an exemplary three position high speed disconnector/switch arrangement to connect the incoming phases ABC with the motor load bus in ABC, CAB and BCA phases in that order, with full flexibility of changeover as well as reconnection back to the system with inherent interlocks at a disconnector level to avoid asynchronous closing.

FIG. 10 represents an exemplary schematic with addition of a third switching element AB (1010). The cycle is complete to the extent that further load transfer can be achieved with the first breaker 52M should an additional transfer become essential. The disconnectors (910, 930) can be provided with suitable mechanical couplings or interlocks (1020) to support the above function.

Figure 11:
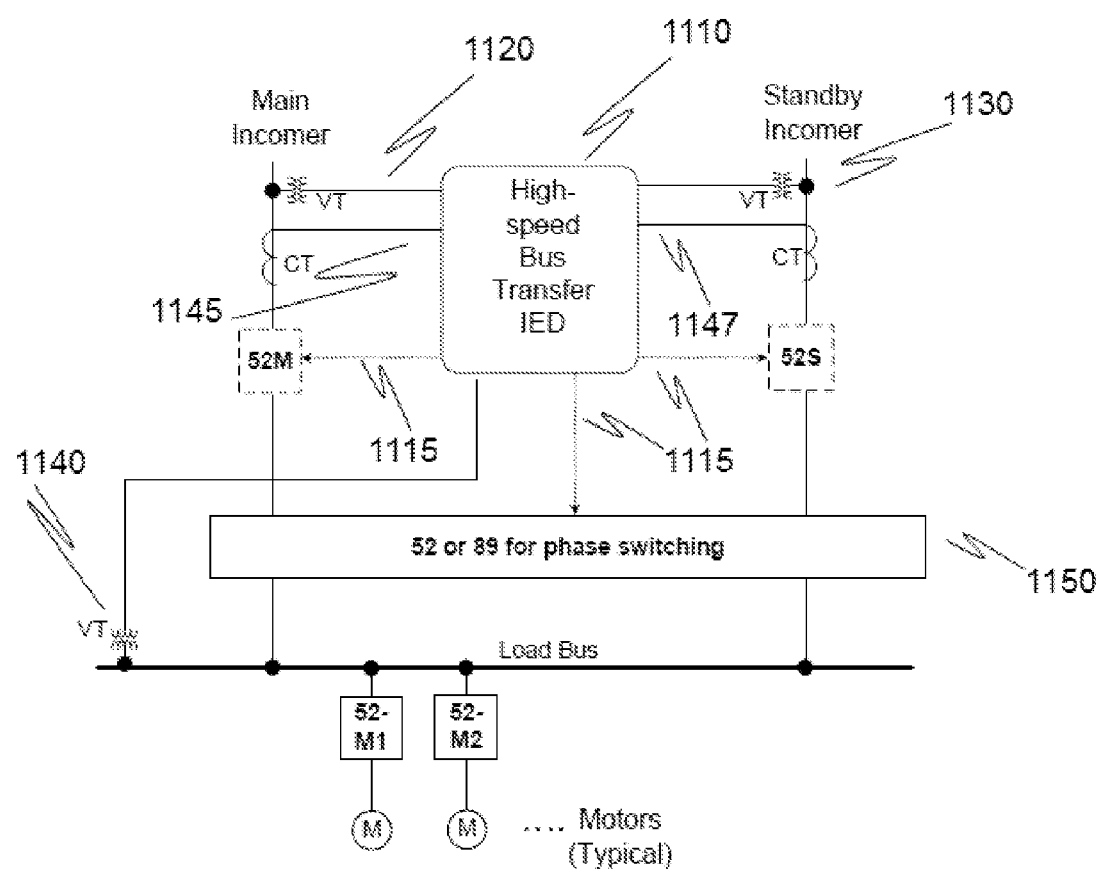
FIG. 11 is a one line diagram of a known supply scheme to a load bus from two incomers with a phase switching facility controlled by an Intelligent Electronic Device (IED).

FIG. 11 illustrates an exemplary block diagram with an IED (1110) to enable fast bus transfer. The IED shown in FIG. 11 is programmed to issue switching commands to breakers/disconnectors (1115), check synchronizing etc. to achieve full or part implementation of the schemes suggested therein. The IED voltage inputs from the main incomer (1120), standby incomer (1130) and the load bus (1140) are provided as an input to the IED for computations related with voltage phase synchronization and magnitude limits for fast bus transfer. Single phase input is sufficient since the other phase voltages can be internally derived by the IED using 120 degree phase rotation but additional phase inputs might improve the measurement process and also aid detecting of other abnormalities in the system as a whole. It is possible to give current inputs from both the incomers (1145, 1147) for aiding transfer functionality. The IED is provided with binary inputs and outputs to monitor and control all the associated switching devices (not shown in the figure). The inputs and outputs can be given through known analog inputs, binary inputs and outputs or through communication channels using either IEC61850 or other methods. The IED may also have additional binary inputs and/or outputs (not shown in the figure) to monitor the status of motors and other loads connected to the bus so as to trip out less critical loads during transfer if necessary. In FIG. 11, the IED is shown to control and operate circuit breakers and disconnector switches (1150) as per any of the configurations described earlier and other commonly known configurations to those skilled in the art.

The following steps can be executed by an IED for initiating a transfer:
1. Receive command or input (external) to initiate transfer (e.g., sense or determine the need for bus transfer (to connect the two sub power systems) based on power system parameter inputs received, or receive external command from another IED in the system).
2. Open breaker, if required by this system, that connects the generator source (main source) bus to the load bus in case of detection of fault in the main generating station.
3. Initiate load shedding of any less critical loads on the load bus. This can be a technique also to provide correction in voltage magnitude to make it more suitable for efficient and fast bus transfer.
4. Look for synchro-check between phases A of stand by incomer and load buses. Based on the rate of decay of voltage and frequency the IED is to take a decision for one of the following steps:
    a. If acceptable considering the breaker closing time to connect standby incomer bus to the load bus 52S, and opening time of breaker at the main source 52G, if synchro-check conditions allow, initiate close command of 52S: Fast transfer accomplished.
    b. Prepare the logic for 120 degree phase switching. If external disconnector is used, switch it to AC position, in preparation (anticipation) for breaker 120 degree closing. Check for synchro-check condition between phase A of source and phase C of load and suitably issue close command: 120 degree phase transfer accomplished.
    c. Similar to the above step above but synchro-check condition to be checked for phases A of source and B of the load and suitable switching action initiated: 240 degree transfer accomplished.
    d. Similar to the above step but synchro check condition to be checked for phases A of source and A of the load and suitable switching action initiated: 360 degree transfer accomplished.
5. During step 4, if the decay rates of voltage and frequency are determined to be too fast for any of the above steps, wait for the voltage to drop below 30% to initiate closure of the breaker at residual condition or after a fixed time.

6. Check the status of the switching status of the breaker and disconnector and prepare the schemes either for next high speed transfer or transfer back to the main source suitably Thus, an exemplary method to operate the circuit breakers and disconnector switches for fast bus transfer using an IED is illustrated. The method is also useful while using phase shifting transformer to provide necessary shift in phase angles (e.g., at supply side or load side) or voltage magnitude correction in anticipation of synchronized power supply at the instance of having the bus transfer and then enable connection between the two sub power systems.

Features disclosed herein can be also applied to higher voltage power systems during resynchronizing or auto-reclosing. For example, two power systems could be connected through a weak link. The link may open out during transient fault or abnormal operating conditions including power swing conditions. The challenge is often to reconnect the systems through either manual or auto-reclosing. Known systems would wait out for the two systems to go through their own internal dynamics before the voltage across respective phases of the systems are within acceptable limits when a close attempt may be made. Exemplary embodiments as disclosed herein can proactively modify the system voltages that are synchronized, thereby improving the chances for a successful reconnection of two systems before the two systems well before their parameters drift too far apart causing permanent separation of the systems. The latter might cause brown outs and black outs in individual systems. Thus the principles disclosed herein in general can be applied to connect two power systems in an electrical network or grid.

While only certain features of the invention have been illustrated and described herein, many modifications and changes will occur to those skilled in the art. It is, therefore, to be understood that the appended claims are intended to cover all such modifications and changes as fall within the true spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for synchronizing and connecting a first multi-phase sub power system with a second multi-phase sub power system with an intelligent electronic device (IED) by use of at least one switching device between the first multi-phase sub power system and the second multi-phase sub power system in an electrical power system, wherein the second subsystem includes a voltage decaying in magnitude and frequency at a first rate of change, the method being implemented on the IED and comprising:

monitoring power supply parameters for the first multi-phase sub power system and the second multi-phase sub power system;

identifying at least one instance for operating the at least one switching device using the monitored power supply parameters, and selecting one instance to connect the first multi-phase sub power system and the second multi-phase sub power system, wherein identifying at least one instance includes predicting magnitudes of phase angle difference and voltage difference between the first multi-phase sub power system and the second multi-phase sub power system, based on measured signal values of the power supply parameters and the first rate of change;

performing phase shifting and/or voltage magnitude correction in the electrical power system in anticipation for synchronizing power supplies on connection of the first multi-phase sub power system power system with the second multi-phase sub power system at the selected one instance; and operating the switching device to connect the first multi-phase sub power system and the second multi-phase sub power system in the electrical power system at the selected one instance;

wherein performing the phase shifting and voltage magnitude correction in anticipation for synchronizing power supplies on connection of the first multi-phase sub power system with the second multi-phase sub power system at the selected one instance includes cross switching of one or more phases of the first multiphase sub power system and the second multi-phase sub power system in the electrical power system.

2. The method as in claim 1, wherein first multi-phase sub power system is an incomer system and the second multi-phase sub power system is a load system.

3. The method as in claim 1, wherein the first multi-phase sub power system or the second multi-phase sub power system is a power generating system.

4. The method as in claim 1, wherein monitoring of power supply parameters comprises:

monitoring measured electrical voltage, current and frequency parameters, and derived information from computing performed in the TED using the measured electrical voltage, current and frequency parameters including at least one of, rate of change of electrical parameters, time to operate the switching device, and time to perform phase shifting.

5. The method as in claim 1, wherein identifying at least one instance for operating the at least one switching device to connect the first multi-phase sub power system and the second multi-phase sub power system comprises:

analyzing available instances for synchronization resulting from having phase shifting or voltage magnitude correction carried out in the first multi-phase sub power system or the second multi-phase sub power system.

6. The method as in claim 1, wherein performing phase shifting and/or voltage magnitude correction in anticipation for synchronizing power supplies on connection of the first multi-phase sub power system with the second multi-phase sub power system at the selected one instance comprises:

phase shifting using a phase shifting transformer in the electrical power system.

7. The method as in claim 1, wherein identifying at least one instance for operating the at least one switching device comprises:

identifying the at least one instance for operating the at least one switching device within an AC slip cycle time period from the instance identifying need for connecting the first multi-phase sub power system with the second multi-phase sub power system.

8. The method as in claim 2, wherein the at least one instance for operating the at least one switching device is an instance at which voltage in the load system is more than about 70% of the voltage in the incomer system.

9. A synchronizing system for an electrical power system to synchronize and connect a first multi-phase sub power system with a second multi-phase sub power system, comprising:
- an Intelligent Electronic Device (IED) that monitors power supply parameters for the first multi-phase sub power system and the second multi-phase sub power system to identify at least one instance of time for synchronization, and to select an instance of time for connection, the IED being configured to issue commands for synchronizing and connecting the first multi-phase sub power system with the second multi-phase sub power system;
- at least one switching device to operate and connect the first multi-phase sub power system and the second multi-phase sub power system on receiving a command from the IED; and
- a means for phase shifting and/or voltage magnitude correction in the first multi-phase sub power system or the second multi-phase sub power system to enable synchronization between the first multi-phase sub power system and the second multi-phase sub power system at a selected instance of time on receiving a synchronization command from the IED;
- wherein the phase shifting and/or voltage magnitude correction includes cross switching of one or more phases of the first multiphase sub power system and the second multi-phase sub power system; and
- wherein the selected instance for operating the at least one switching device is within an AC slip cycle time period.

10. The synchronizing system for an electrical power system as in claim 9, wherein the at least one switching device is a circuit breaker or a disconnector switch, and wherein the means for phase shifting or/and voltage magnitude correction in the first multi-phase sub power system or the second multi-phase sub power system to enable synchronization between the first multi-phase sub power system and the second multi-phase sub power system at the at least one identified instance of time on receiving a synchronization command from the IED is configured to control the at least one switching device or to control a phase shifting transformer.

11. The synchronizing system for an electrical power system as in claim 9, in combination with the electrical power system which comprises:
- the first multi-phase sub power system and the second multi-phase sub power system which are connected via the synchronizing system.

12. The synchronizing system for an electrical power system as in claim 10, in combination with the electrical power system which comprises:
- the first multi-phase sub power system and the second multi-phase sub power system which are connected via the synchronizing system.

* * * * *